(12) United States Patent
Tanaka

(10) Patent No.: US 6,476,929 B1
(45) Date of Patent: Nov. 5, 2002

(54) FILE INTEGRATING APPARATUS AND METHOD, RECORDING MEDIUM STORING FILE INTEGRATING PROGRAM, PRINTER CONTROL SYSTEM AND PRINTER CONTROL METHOD

(75) Inventor: Hiroshi Tanaka, Asaka (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 09/471,121

(22) Filed: Dec. 23, 1999

(30) Foreign Application Priority Data

Dec. 28, 1998 (JP) .......................................... 10-372781

(51) Int. Cl.⁷ .............................................. G06K 15/00
(52) U.S. Cl. ...................................... 358/1.17; 358/1.1
(58) Field of Search ................................ 358/1.1, 1.13, 358/1.14, 1.15, 1.16, 400, 401, 403, 404, 405, 406; 705/26, 14, 10, 41; 345/530, 531, 532, 536, 537

(56) References Cited

U.S. PATENT DOCUMENTS 6,229,620 B1 * 5/2001 Makitani et al. ............ 358/1.13
6,359,699 B1 * 3/2002 Yoneta et al. .................. 235/38

\* cited by examiner

*Primary Examiner*—Arthur G. Evans
(74) *Attorney, Agent, or Firm*—McGinn & Gibb, PLLC

(57) ABSTRACT

The contents of memory cards on each of which are recorded image files and an order file storing orders for printing images are integrated on a magneto-optic disk. In a file integrating mode, a memory card directory is generated for every memory card on the magneto-optic disk. The images files and order file that have been recorded on a memory card are copied to the magneto-optic disk while the directory structure of the memory card is maintained in such a manner that the image files and order file will be registered in the directory of this memory card. Information that is contained in the copied order file is written to an integrated order file. The content of an order for printing an image can be ascertained by checking the content of the integrated order file.

11 Claims, 20 Drawing Sheets

Fig. 4

ORDER FILE

```
[INFO]
Creator = " (NAME OF MODEL THAT CREATED ORDER FILE)"
CreateDateTime = 1998/12/24  14:10:30

[ORDER]
OrderID = 001
PrintType = Standard
ImageFile = " ..¥IMFIDX10¥DSC00001.JPG"
Quantity = 3

[ORDER]
OrderID = 002
PrintType = Standard
ImageFile = " ..¥IMFIDX10¥DSC00004.JPG"
Quantity = 2

[ORDER]
OrderID = 003
PrintType = Standard
ImageFile = " ..¥IMFIDX10¥DSC00015.JPG"
Quantity = 1

.
           .
           .
           .

(EOF)
```

Fig. 6

INTEGRATED ORDER FILE

```
[INFO]
Integrator = "  (NAME OF MODEL THAT INTEGRATED ORDER FILES) "
IntegrateDateTime = 1999/01/01  10:15:15

[ODR_FILE]
OrderFile = " ..¥MEDIA001¥ORDER.TXT"
Creator = " ABC Company/Super Shot100"
CreateDateTime = 1998/12/24  14:10:30
MediaVolume = " Christmas"

[ODR_FILE]
OrderFile = " ..¥MEDIA002¥ORDER.TXT"
Creator = " ABC Company/Super Shot100"
CreateDateTime = 1998/12/31  23:50:10
MediaVolume = None
            .
            .
            .
            .
[ODR_FILE]
OrderFile = " ..¥MEDIAnnn¥ORDER.TXT"
Creator = " XYZ Corp./Ultra Shot200"
CreateDateTime = 1999/01/01  00:00:25
MediaVolume = " New Year"

(EOF)
```

Fig. 16

INTEGRATED ORDER FILE

```
[INFO]
Integrator = "  (NAME OF MODEL THAT INTEGRATED ORDER FILES) "
IntegrateDateTime = 1999/01/01  10:15:15

[ODR_FILE]
OrderFile = 001

[ODR_FILE]
OrderFile = 002
         .
         .
         .
         .
         .

[ODR_FILE]
OrderFile = nnn (EOF)
```

Fig. 17

INTEGRATED ORDER FILE

```
[INFO]
Integrator = "  (NAME OF MODEL THAT INTEGRATED
                                   ORDER FILES) "
IntegrateDateTime = 1999/01/01  10:15:15

[ODR_FILE]
OrderFile = " ..¥MEDIA001"

[ODR_FILE]
OrderFile = " ..¥MEDIA002"
               .
               .
               .
[ODR_FILE]
OrderFile =  " ..¥MEDIAnnn"
 (EOF)
```

FILE INTEGRATING APPARATUS AND METHOD, RECORDING MEDIUM STORING FILE INTEGRATING PROGRAM, PRINTER CONTROL SYSTEM AND PRINTER CONTROL METHOD

BACKGROUND OF THE INVENTION

1. Field of the Invention

This invention relates to an apparatus and method for integrating, on an integrating recording medium, image files in which image data has been stored and order files in which order data, which is for specifying image files storing image data that is to be printed, has been stored, a recording medium on which a program for integrating order files has been stored, a printer control system and method, and a recording medium on which a program for controlling a printer has been stored.

2. Description of the Related Art

Image data representing the image of a subject photographed by a digital camera is recorded on a memory card or on some other recording medium. The recording medium is loaded into a personal computer possessed by the user of the digital camera and the image of the subject is printed by a printer that has been connected to the personal computer.

The printer possessed by the user often has a low resolution. For this reason, there is increasing availability of services in which the user brings the recording medium to a processing laboratory and the images represented by image data that has been recorded on the recording medium are printing using a high-quality printer with which the laboratory is provided.

DISCLOSURE OF THE INVENTION

In a service of this kind, it is contemplated to store on the recording medium not only image data representing the images of subjects to be printed but also order information such as which images are to be printed and the number of copies of each. A clerk at the processing laboratory checks the content of an order by reading the order information that has been recorded on the recording medium. This makes it possible to eliminate the task of writing out an order form at the laboratory while checking the images represented by the image data that has been recorded on the recording medium.

In a case where the images are printed at the laboratory, the recording medium on which the image data representing the images has been recorded must be left at the laboratory. During such time the user cannot use the recording medium. In a case where image data representing images to be printed have been recorded on a plurality of recording media, all of these recording media must be left at the laboratory and, hence, the user cannot use them.

Further, if the billing system used by the laboratory is such that a basic fee is charged based upon the number of recording media, handing over a large number of recording media can result in a high printing fee.

Accordingly, an object of the present invention is to arrange it so that ordering the printing of images based upon order information can be performed without leaving a plurality of recording media at a processing laboratory.

According to a first aspect of the present invention, there is provided a file integrating apparatus comprising a reading unit for reading image files and an order file from each of a plurality of recording media that are for copying, wherein the image files, in which image data has been stored, and the order file, in which data for specifying image files in which image data to be printed has been stored, have been recorded on each of the recording media in accordance with a predetermined directory structure; a directory generating unit (directory generating means) for generating a directory associated with each of the plurality of recording media for copying and recording these directories on an integrating recording medium; and a copying unit for copying the image files and the order file, which have been read by the reading unit, under a corresponding directory from among the directories generated by the directory generating unit, while maintaining the directory structure of the recording medium for copying in which these read files were stored.

The first aspect of the present invention provides also a method suited to the above-described file integrating apparatus. Specifically, the method comprises the steps of: reading image files and an order file from each of a plurality of recording media that are for copying, wherein the image files, in which image data has been stored, and the order file, in which order data for specifying image files in which image data to be printed has been stored, have been recorded on each of the recording media in accordance with a predetermined directory structure; generating a directory associated with each of the plurality of recording media that are for copying and recording these directories on an integrating recording medium; and copying the read image files and order files under a corresponding directory from among the generated directories while maintaining the directory structure of the recording medium that is for copying in which these read files were stored.

The first aspect of the present invention further provides a recording medium on which has been stored a program capable of being read by a computer for executing the above-described method.

In accordance with the present invention, the above-mentioned image files and order file are copied under a corresponding directory of the integrating recording medium while maintaining the directory structure of the recording medium that is for copying on which these files were stored. Even if image data representing images to be printed has been recorded over a plurality of recording media, the user need only deliver the integrating recording medium to the processing laboratory. The plurality of recording media need not be left at the laboratory.

Since the image files and order file can be recorded on the integrating recording medium while maintaining the directory structure, it is possible by referring to an order file to retrieve an image file in which image data to be printed has been stored.

In a preferred embodiment, an integrated order file is generated and recorded on the integrating recording medium, and data relating to order data that has been stored in read order files of the plurality of recording media that are for copying is stored in the integrated order file.

Since data relating to order data that has been stored in order files that have been recorded on the plurality of recording media for copying purposes are stored in the integrated order file, the content of an order can be ascertained merely by checking the integrated order file.

The above-mentioned order data may be so adapted as to specify the image files by relative paths.

Even in a case where the image files and the order file have been copied to the integrating recording medium, an image file representing an image to be printed can be found using the relative path.

Furthermore, an arrangement may be adopted in which it is determined whether an order file identical with the above-mentioned order file copied by the copying unit has already been recorded on the integrating recording medium, and a warning is issued in response to a determination to the effect that an identical order file has been recorded on the integrating recording medium.

Since it is possible to prevent an identical order file from being stored on the integrating recording medium, redundant printing of identical images can be prevented.

An arrangement may be adopted in which when all order data that has been stored in an order file is the same, it is decided that the data is identical, or in which when some of the order data that has been stored in an order file coincide, it is decided that the data is identical.

It is preferred that the order file, image files designated by the order data and the integrated order file are copied to the integrating recording medium while maintaining the directory structure.

Only image data representing an image to be printed is copied to the integrating recording medium. Unnecessary image data not used in printing is not copied to the integrating recording medium. As a result, it is possible to prevent the capacity of the integrating recording medium from being exceeded.

According to a second aspect of the present invention, there is provided a printer control system comprising: a reading unit for reading content of an integrated order file from an integrating recording medium on which have been recorded image files, in which image data has been stored, order files, in which order data for specifying image data to be printed has been stored, and the integrated order file, in which data relating to order data that has been stored in the order files has been stored; an image-file retrieval unit (image-file retrieval means) for retrieving, on the basis of the content of the integrated order file read by the reading unit, an image file in which image data representing an image to be printed has been stored; and a printer control unit for controlling a printer so as to print an image represented by image data that has been stored in an image file found as the result of retrieval by the image-file retrieval unit.

The second aspect of the present invention provides also a method suited to the above-described system. Specifically, the method comprises the steps of: reading content of an integrated order file from an integrating recording medium on which have been recorded image files, in which image data has been stored, order files, in which order data for specifying image data to be printed has been stored, and the integrated order file, in which data relating to order data that has been stored in the order files has been stored; retrieving, on the basis of the content of the read integrated order file, an image file in which image data representing an image to be printed has been stored; and controlling a printer so as to print an image represented by image data that has been stored in an image file found as the result of retrieval.

The second aspect of the present invention further provides a recording medium on which has been stored a program capable of being read by a computer for executing the above-described method.

By referring to the integrated order file, an individual wishing to print an image is capable of readily retrieving an image file in which the image data representing the image to be printed has been stored.

An arrangement may be adopted in which the system further comprises a determination unit (determination means) for determining whether the integrated order file has been recorded on the integrating recording medium, wherein when the determination unit has determined that the integrated order file has not been recorded, the image-file retrieval unit retrieves an image file, in which image data representing an image to be printed has been stored, based upon the order file.

Thus, even if the integrated order file is not found, it is possible to find an image file in which image data representing an image to be printed has been stored.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 4 illustrates the content of an order file;

FIG. 6 illustrates the content of an integrated order file;

FIGS. 16 and 17 illustrate the content of an integrated order file;

DESCRIPTION OF THE PREFERRED EMBODIMENTS

Ordinary printers possessed by users of personal computers often have a low resolution. If an image represented by image data that has been recorded on a memory card is printed using the printer possessed by the user, only an image of low resolution can be printed. A processing laboratory, on the other hand, is equipped with a printer capable of printing a high-resolution image. If it is desired to print a high-resolution image, therefore, a memory card on which image data representing the image to be printed has been recorded is brought to the laboratory and the image is printed using the printer with which the laboratory is provided.

In a case where images represented by the image data recorded on a memory card are to be printed at a laboratory, it is preferred that the user first create an order file indicating the numbers of prints and which images represented by the image data are to be printed, and that this order file be recorded on the memory card. This will allow the operator at the laboratory to check the content of an order merely by looking at the content of the order file.

If there are a plurality of images to be printed and the image data representing these images has been recorded in a form spread over a plurality of memory cards, all of these memory cards must be brought to the laboratory. According to this embodiment, image data recorded in a form spread over a plurality of memory cards and order files are integrated on a single magneto-optic (MO) disk. It goes without saying that the recording media are not limited to the memory card and magneto-optic disk.

Figure 1:
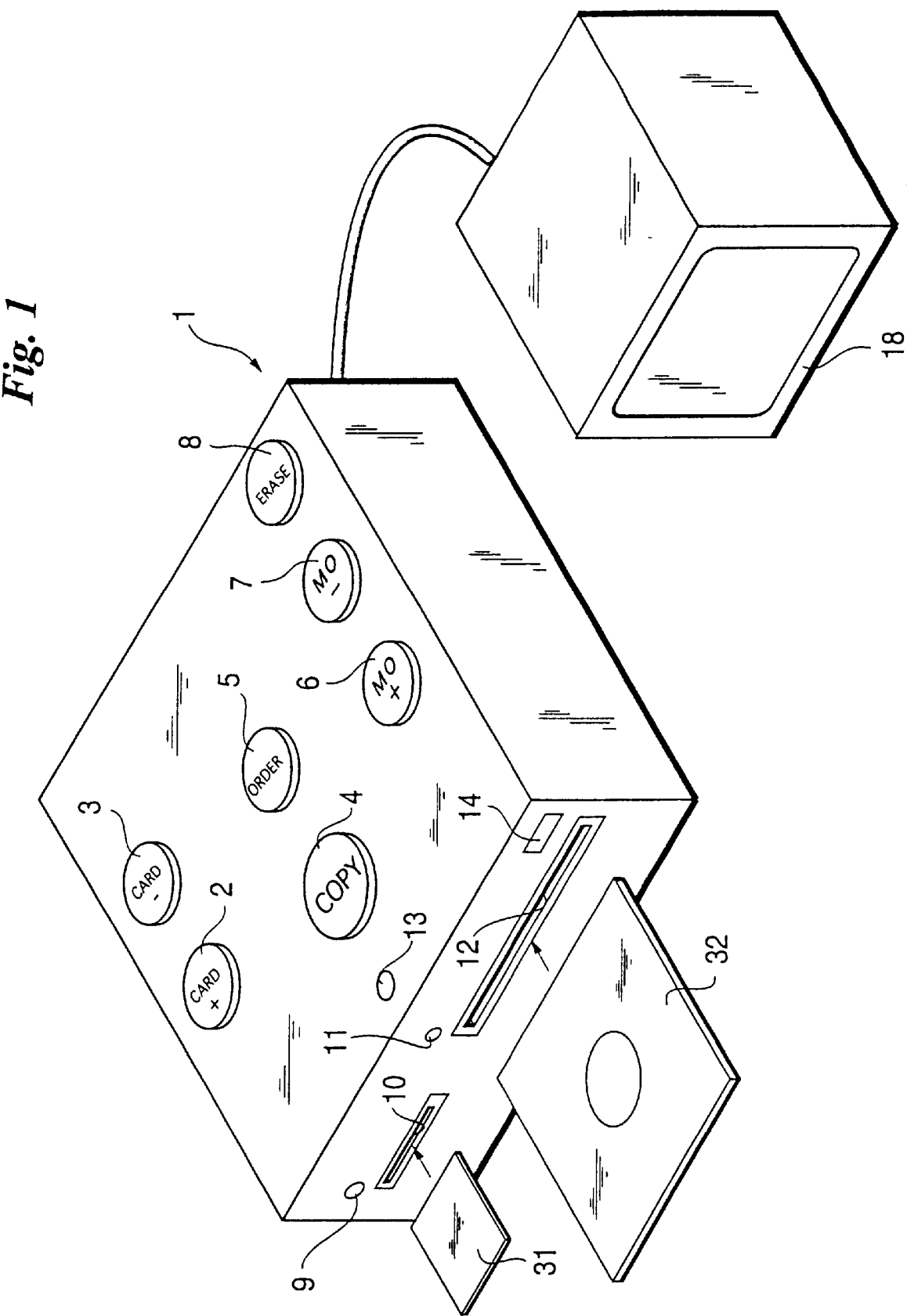
FIG. 1 is a perspective view illustrating an order integrating apparatus.

FIG. 1 illustrates the appearance of an order integrating apparatus (file integrating apparatus).

An order integrating apparatus 1 has a monitor 18 connected thereto. Processing for reproducing image data that has been recorded on a memory card 31 or magneto-optic disk 32 can be executed by the order integrating apparatus 1, and the reproduced images may be displayed on the display screen of the monitor 18 connected to the order integrating apparatus 1.

The order integrating apparatus 1 has a front panel the left side of which is formed to have a memory-card slot 10 for inserting the memory card (recording medium for copying) 31. Provided at the upper left of the memory-card slot 10 is a memory-card access lamp 9 for indicating that a memory-card reader/writer of the order integrating apparatus 1 is accessing the memory card 31 that has been inserted into the memory-card slot 10. The memory-card access lamp 9 lights when the memory-card reader/writer is accessing the memory card 31.

Formed on the right side of the front panel of order integrating apparatus 1 is a magneto-optic disk slot 12 for inserting the magneto-optic disk (integrating recording medium) 32. Provided at the upper left of the magneto-optic disk slot 12 is a drive access lamp 11 for indicating that a magneto-optic disk drive of the order integrating apparatus 1 is accessing the magneto-optic disk 32 that has been inserted into the magneto-optic disk slot 12. The drive access lamp 11 lights when the magnet-optic disk drive is accessing the magneto-optic disk 32.

A power switch 14 is provided at the upper-right corner on the front panel of the order integrating apparatus 1.

The order integrating apparatus 1 has a top the left side of which is formed to have memory-card playback switches 2 and 3. A mode for playing back the memory card 31 is established by pressing the memory-card playback switch 2 or 3. If the memory-card playback switch 2 is pressed after the playback mode is established, the reproduced image is incremented. If the other memory-card playback switch 3 is pressed, the reproduced image is decremented.

The right side of the order integrating apparatus 1 on the top thereof is formed to have playback switches 6 and 7 for playing back the magneto-optic disk 32. A mode for playing back the magneto-optic disk 32 is established by pressing the magneto-optic disk playback switch 6 or 7. If the magneto-optic disk playback switch 6 is pressed after the playback mode is established, the reproduced image is incremented. If the other magneto-optic disk playback switch 7 is pressed, the reproduced image is decremented.

A copy switch 4 is formed on the top side of the order integrating apparatus 1 near the front edge substantially at the midpoint thereof. Pressing the copy switch 4 establishes a copy mode. Image files and an order file that have been recorded on the memory card 31 inserted into the memory-card slot 10 are copied to the magneto-optic disk 32 inserted into the magneto-optic disk slot 12 while the directory structure of these files is maintained.

An order switch 5 is formed on the top side of the order integrating apparatus 1 substantially at the center thereof. The order switch 5 functions in combination with the copy switch 4 or with either of the magneto-optic disk playback switches 6, 7.

A file integrating mode is established when the order switch 5 and copy switch 4 are pressed simultaneously. In this mode image files and an order file that have been recorded on the memory card 31 are recorded on the magneto-optic disk 32. Order integrating processing in the file integrating mode differs from simple copy processing in that image files representing images specified by order data that has been stored in the order file are recorded on the magneto-optic disk 32 and the order file that has been recorded on the memory card 31 is stored in the integrated order file of the magneto-optic disk 32.

When the order switch 5 and magneto-optic disk playback switch 6 or 7 are pressed simultaneously, a print ordering mode involving the magneto-optic disk 32, which is currently being played back, is established.

An integration display lamp 13 indicating that integrating processing is being executed is provided in front of the copy switch 4. The integration display lamp 13 lights during integrating processing.

An erase switch 8 is provided at the upper right-hand corner of the order integrating apparatus 1 on the top side thereof. An erase mode is established if the erase switch 8 is pressed during playback of the magneto-optic disk 32. In this mode an image file and an order file that have been registered in a directory which manages image data representing an image currently being played back are erased.

Figure 2:
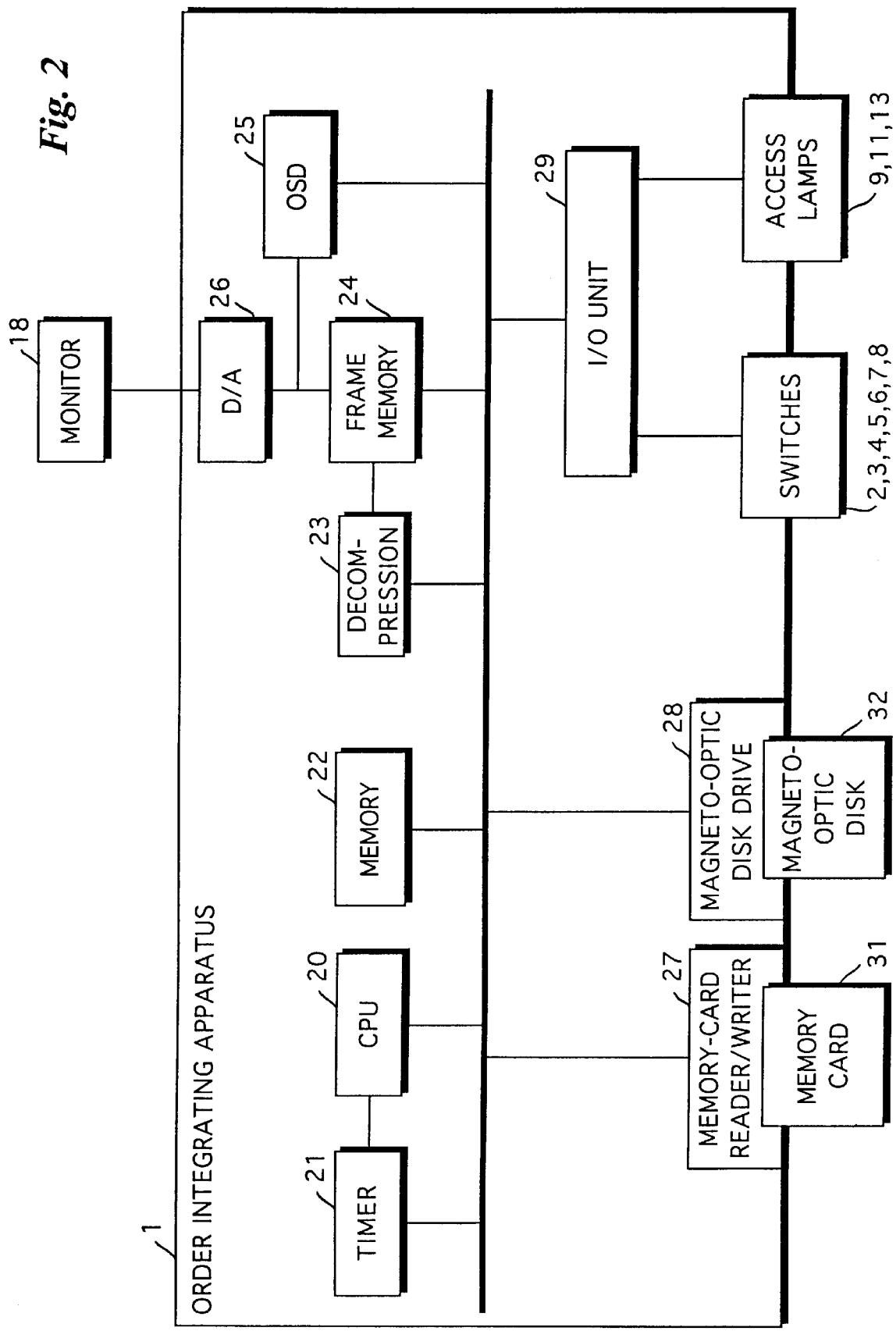
FIG. 2 is a block diagram illustrating the electrical structure of the order integrating apparatus.

FIG. 2 is a block diagram illustrating the electrical structure of the order integrating apparatus 1.

The overall operation of the order integrating apparatus 1 is controlled by a CPU 20.

The memory card 31 is accessed by a memory-card reader/writer 27, and the magneto-optic disk 32 is accessed by a magneto-optic disk drive 28.

Signals representing pressing of the memory-card playback switches 2 and 3, copy switch 4, order switch 5, magneto-optic disk playback switches 6 and 7 and erase switch 8 are input to the CPU 20 via an I/O (input/output) unit 29. A display control signal also is supplied from the CPU 20 to the access lamps 9, 11 and 13 via the I/O unit 29.

When an image represented by image data that has been recorded on the memory card 31 or magneto-optic disk 32 is displayed, the image data, which has been read out of the memory-card reader/writer 27 or magneto-optic disk drive 28, is applied to a frame memory 24, where the data is stored temporarily. If the image data has been compressed, it is applied to a decompressing circuit 23 so that the compressed image data may be subjected to decompression processing. The decompressed image data is applied to the frame memory 24 and is stored there temporarily.

The image data is read out of the frame memory 24 and applied to a digital/analog converting circuit 26. Here the image data is converted to an analog video signal and then input to the monitor 18. A image represented by image data that has been recorded on the memory card 31 or magneto-optic disk drive 28 is displayed on the display screen of the monitor 18.

The order integrating apparatus 1 is further provided with an on-screen device (OSD) 25. The on-screen device 25 generates image data representing display information that is for being displayed in superimposed form on an image displayed on the display screen of the monitor 18. This image data also is applied to the digital/analog converting circuit 26 so as to be converted to an analog video signal. By thus applying the analog video signal resulting from the conversion to the monitor 18, prescribed information is displayed on an image being displayed on the display screen of the monitor 18.

The order integrating apparatus 1 includes also a timer 31 by which time is measured.

Figure 3:
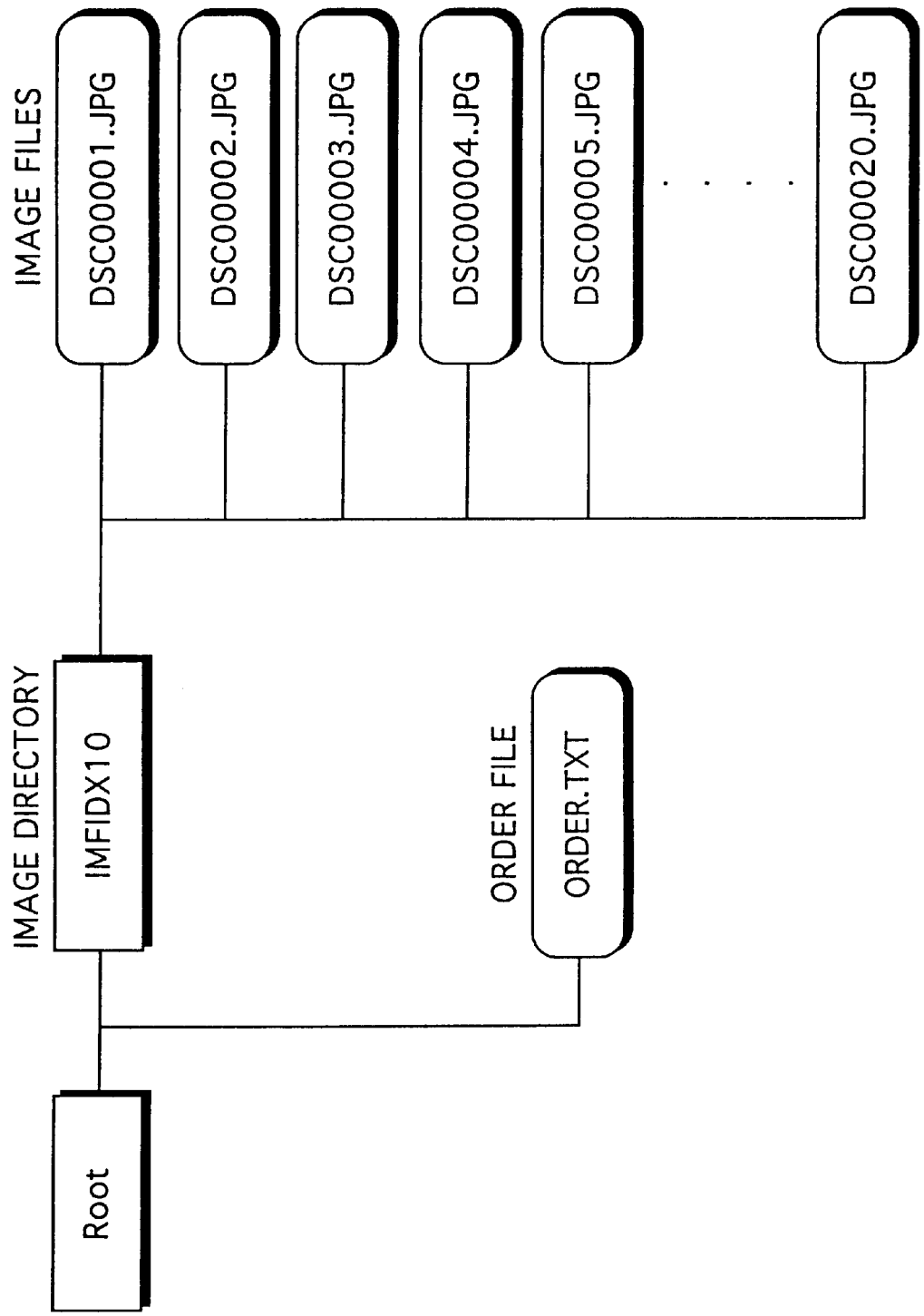
FIG. 3 is a diagram illustrating the directory structure of a memory card.

FIG. 3 illustrates the directory structure of the memory card 31, and FIG. 4 illustrates the content of an order file that has been recorded on the memory card 31.

Image files having the file names "DSC00001.JPG" to "DSC00020.JPG" have been recorded on the memory card 31. These image files are managed by a directory "IMFIDX10" (this directory shall be referred to as an "image directory"). The directory "IMFIDX10" and an order file (whose file name is "ORDER.TXT") have been registered in a root directory. The memory card 31 possessing this directory structure can be created using a digital camera having an order-file creating function.

The order file has an [INFO] section and an [ORDER] section.

The [INFO] section has a "Creator" area and a "CreateDateTime" area. The model name of the apparatus that created the order file has been recorded in the "Creator" area, and the date and time at which the order file was created have been registered in the "CreateDateTime" area of the [INFO] section.

The [ORDER] section has "OrderID", "PrintType", "ImageFile" and "Quantity" areas. The identified number of order has been recorded in the "Order ID" area, the type of printing to be used for an image to be printed has been recorded in the "PrintType" area, a relative path to an image file storing image data representing an image to be printed has been recorded in the "ImageFile" area, and the number of prints of an image to be printed has been recorded in the "Quantity" area.

As shown in FIG. 4, (EOF) (End of File) is shown in the order file for convenience sake in order to indicate the end of the file. However, a code representing (EOF) is not written in the actual file.

Figure 5:
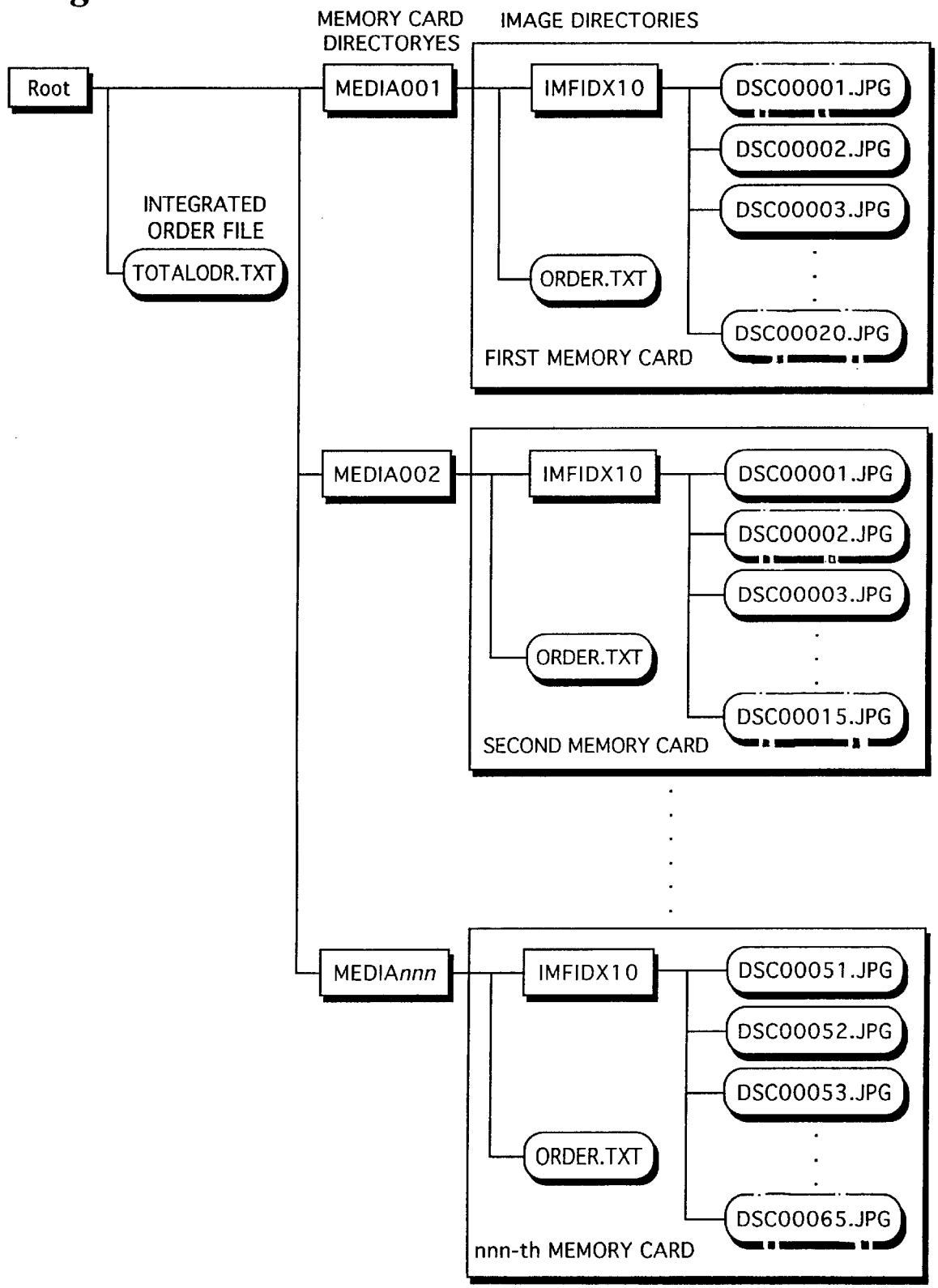
FIG. 5 illustrates the directory structure of a magneto-optic disk on which image files and order files have been integrated.

FIG. 5 illustrates the directory structure of a magneto-optic disk on which files have been integrated by the order integrating apparatus according to this embodiment, and FIG. 6 illustrates the content of an integrated order file generated by the order integrating apparatus 1.

The integrated order file (whose title name is "TOTALODR.TXT") generated by the order integrating apparatus has been registered in a root directory. Subdirectories have been appended for corresponding ones of the memory cards whose files have been integrated on the magneto-optic disk 32. These subdirectories shall be referred to as "memory card directories". According to this embodiment, the memory card directories appended are "MEDIA001" to "MEDIAnnn" (where the nnn portion of the memory card directory is referred to as the "directory number"). The order file and image files that have been recorded on a corresponding memory card are copied to the magneto-optic disk 32 and registered in the memory card directory while the directory structure of the memory card is maintained.

Files that have been recorded on a first memory card are registered in the memory card directory "MEDIA001". Files that have been recorded on a second memory card are registered in the memory card directory "MEDIA002". Files that have been recorded on an nnn-th memory card are registered in the memory card directory "MEDIAnnn".

In FIG. 5, image files enclosed by the broken lines are files storing image data for which printing of the images has not been ordered. In the order integrating processing, such image files are not copied to the magneto-optic disk 32 even through they have been recorded on the memory card 31.

By way of example, the fact that images represented by image data that has been stored in image files having the file names "DSC00002.JPG" and "DSC00003.JPG" are to be printed is indicated by order data that has been stored in the order file in the first memory card. Further, the fact that images represented by image data that has been stored in image files having the file names "DSC00001.JPG" and "DSC00003.JPG" are to be ordered for printing is indicated by order data that has been stored in the order file in the second memory card. Similarly, the fact that images represented by image data that has been stored in image files having the file names "DSC00051.JPG" and "DSC00052.JPG" are to be ordered for printing is indicated by order data that has been stored in the order file in the nnn-th memory card.

The integrated order file includes an [INFO] section and an [ODR_FILE] section.

The [INFO] section has an "Integrator" area and an "IntegrateDateTime" area. The model name of the apparatus that integrated the order files has been recorded in the "Creator" section, and the date and time at which the integrated order file was generated have been registered in the "IntegrateDateTime" area.

The [ODR_FILE] section has "OrderFile", "Creator", "CreateDateTime" and "MediaVolume" areas. A relative path to an order file has been recorded in the "OrderFile" area, the model name of the camera that captured an image to be printed has been recorded in the "Creator" area, the date and time at which the image to be printed was captured have been recorded in the "CreateDateTime" area, and a user comment regarding the image to be printed has been recorded in the "MediaVolume" area.

As shown in FIG. 6, (EOF) (End of File) is shown in the integrated order file for convenience sake in order to indicate the end of the file. However, a code representing (EOF) is not written in the actual integrated order file.

FIGS. 7 to 15 are flowcharts illustrating the procedure of processing executed by the order integrating apparatus 1.

When power is introduced to the order integrating apparatus 1, it is determined whether any of the switches of the order integrating apparatus 1 has been pressed. Specifically, it is determined whether the memory-card playback switch 2 or 3 has been pressed (step S21), whether the magneto-optic (MO) disk playback switch 6 or 7 has been pressed (step S31), whether the order switch 5 and magneto-optic disk playback switch 6 have been pressed simultaneously (steps S41 and S61), whether the erase switch 8 has been pressed (step S81), whether the copy switch 4 has been pressed (step S91), and whether the order switch 5 and copy switch 4 have been pressed simultaneously (step S111). The order integrating apparatus 1 is placed in the mode that conforms to the switch or switches pressed.

First, assume that the memory-card playback switch 2 or 3 has been pressed ("YES" at step S21). In such case the order integrating apparatus 1 is placed in the memory-card playback mode (see FIG. 8).

If the memory-card playback mode is established, it is determined whether the memory card 31 has been inserted into the memory-card slot 10 (step S22). It goes without saying that this determination is made based upon a signal from a sensor provided inside the memory-card slot 10.

If the memory card 31 has been inserted into the memory-card slot 10 ("YES" at step S22), then it is determined whether image files have been recorded on the inserted memory card 31.

If image files have been recorded on memory card 31 ("YES" at step S23), the user presses the memory-card playback switch 2 or 3, whereby processing for selecting an image to be played back is executed (step S24). By pressing the memory-card playback switch 2, the frame that follows the frame of an image represented by image data stored in an image file that was recorded on the memory card 31 last is selected as the playback image. (In other words, the frame of an image represented by image data stored in an image file that was recorded on the magneto-optic disk 32 first is selected.) By pressing the memory-card playback switch 3, the image of a frame immediately preceding an image represented by image data stored in an image file that was recorded on the memory card 31 last is selected as the playback image.

Image data representing a selected image is read out of the memory card 31 and this image is then applied to the monitor 18 via the decompressing circuit 23, frame memory 24 and digital/analog converting circuit 26, as described above. The selected playback image is displayed on the display screen of the monitor 18 (step S25).

It is determined whether an order file has been recorded on the memory card 31 (step S26). If an order file has been recorded on the memory card 31 ("YES" at step S26), "ImageFile" stored in the order file is referred to and it is determined whether the playback image being displayed on the monitor 18 has been ordered as an image to be printed (step S27). If the image being displayed on the monitor 18 has been ordered as an image to be printed ("YES" at step S27), order display information is output from the OSD 25. As a result, information indicating the fact that the displayed image has been ordered is displayed in a form superimposed on the image being displayed on the display screen of the monitor 18 (step S28). Thus the user is capable of confirming whether or not printing of the image has been ordered.

Figure 7:
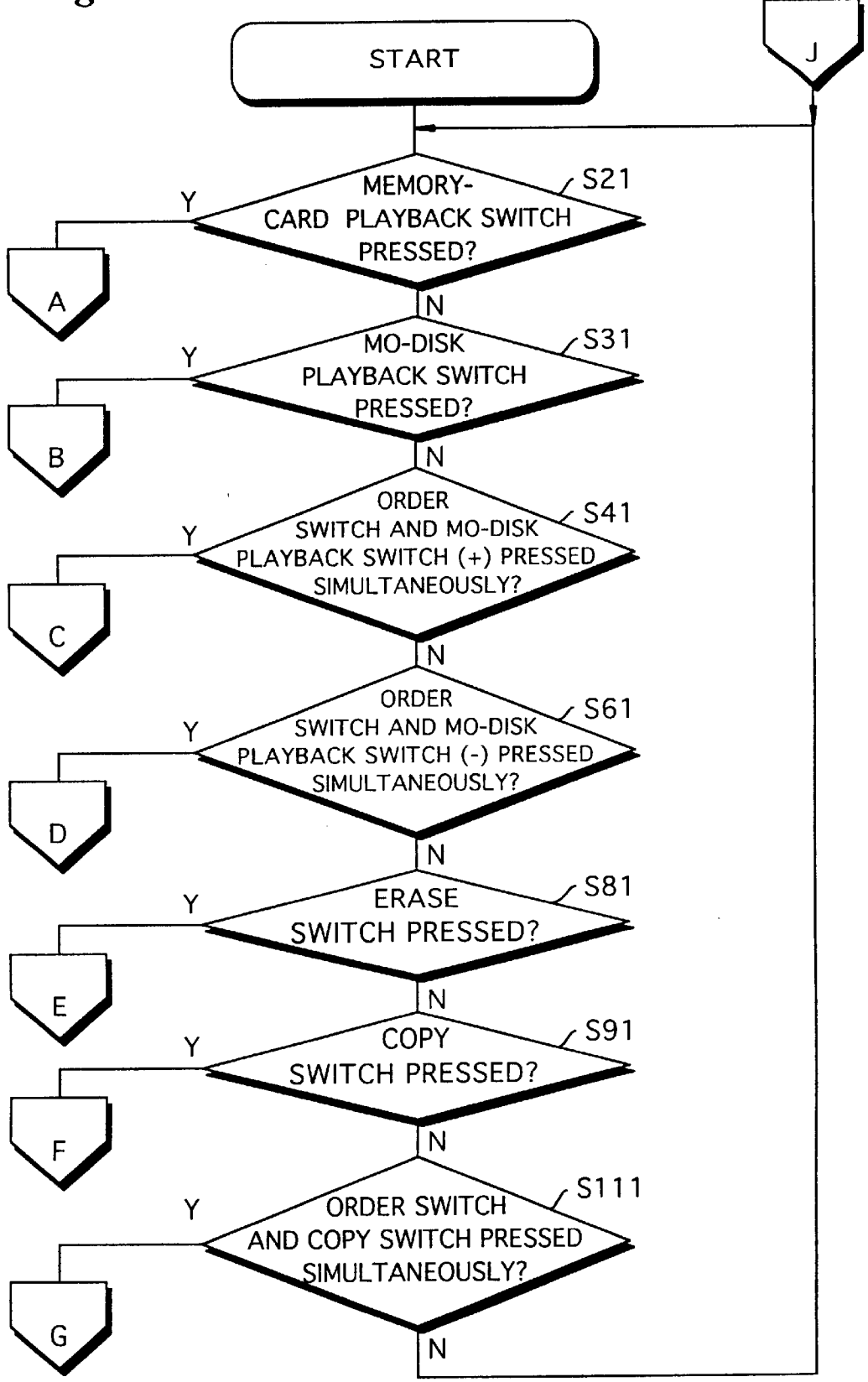
FIGS. 7 to 15 are flowcharts illustrating a procedure for processing an integrated order file.
Figure 8:
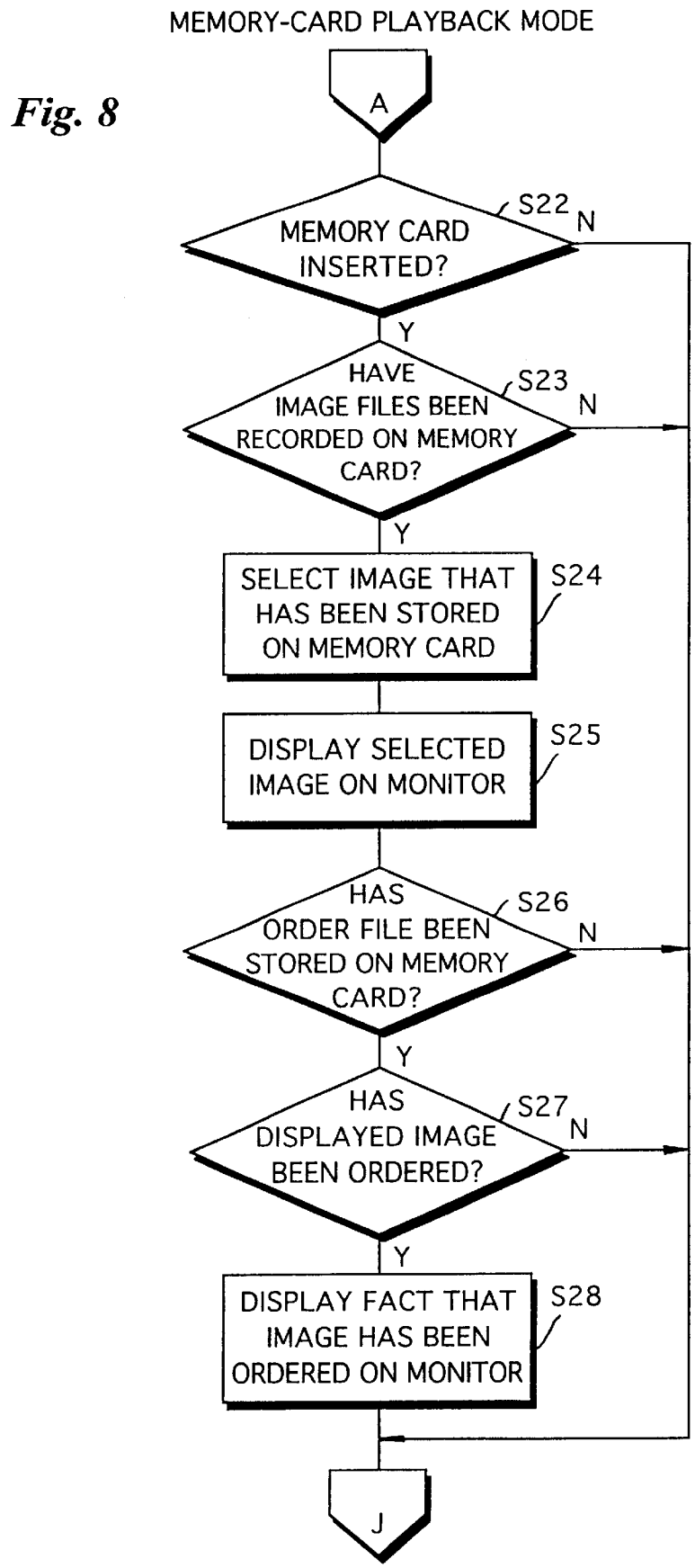
Figure 9:
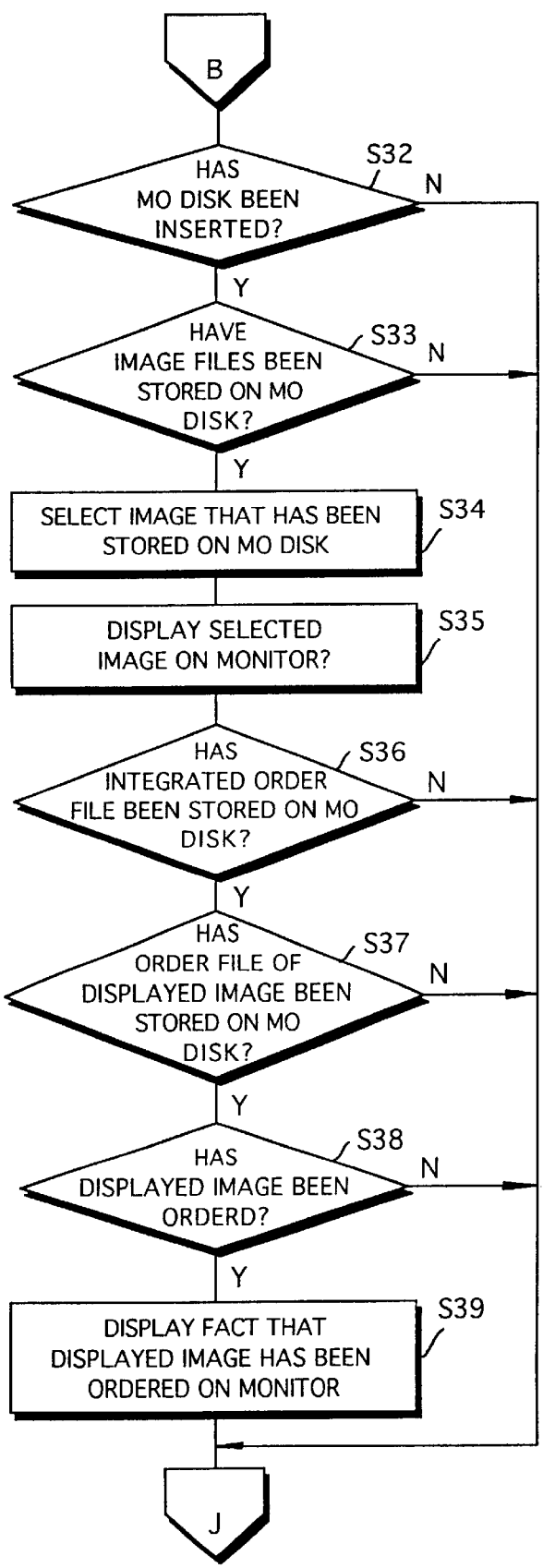
Figure 10:
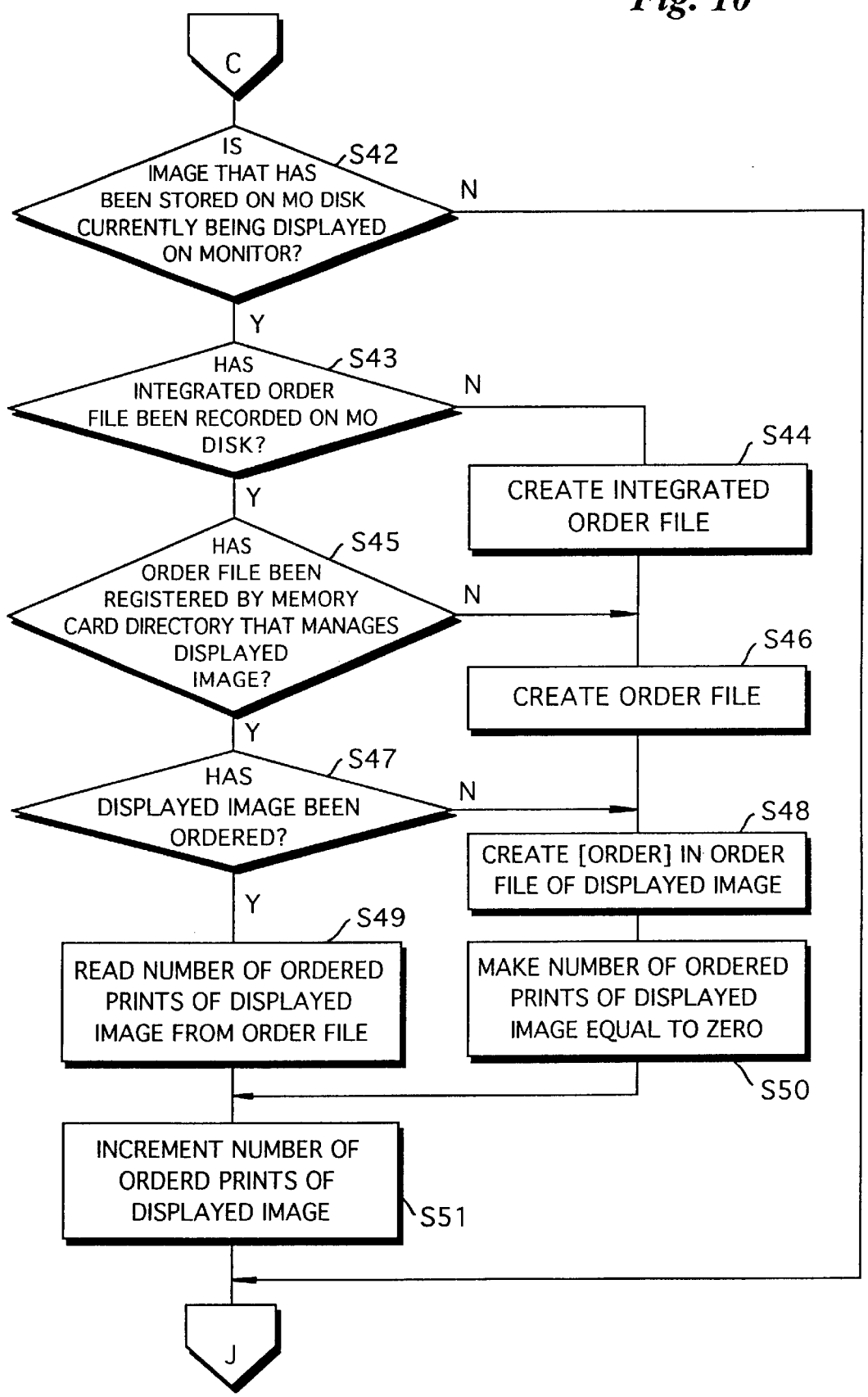

Assume that the user has pressed the magneto-optic disk playback switch 6 or 7 without pressing the memory-card playback switch 2 or 3 ("NO" at step S21 in FIG. 7). The magneto-optic disk playback mode (see FIG. 9) is established by pressing the magneto-optic disk playback switch 6 or 7.

It is determined whether the magneto-optic disk 32 has been inserted into the magneto-optic disk slot 12 (step S32). In this case also, in a manner similar to that when checking for insertion of the memory card 31, it goes without saying that whether or not the magneto-optic disk 32 has been inserted is checked based upon an output from a sensor provided inside the magneto-optic disk slot 12.

If the magneto-optic disk 32 has been inserted into the magneto-optic disk slot 12 ("YES" at step S32), then, in a manner similar to the processing for playing back the memory card 31, it is determined whether image files have been stored on the magneto-optic disk 32 (step S33), processing (step S34) for selecting a playback image based upon pressing of magneto-optic disk playback switch 6 or 7 is executed, and processing (step S35) for displaying the selected image on the display screen of the monitor 18 is executed.

Next, it is determined whether an integrated order file has been recorded on the magneto-optic disk 32 (step S36) and whether an order file for the displayed image has been recorded (step S37). If the integrated order file and order file have been recorded ("YES" at steps S36 and S37), then the order file indicated by "OrderFile" of the integrated order file is referred to and it is determined whether the image being displayed on the display screen of the monitor 18 has been ordered as an image to be printed (step S38).

Information indicating that the image being displayed on the display screen of the monitor 18 has been ordered is generated by the OSD 25 and displayed in a form superimposed on the displayed image (step S39).

In a case where order processing is executed using the order integrating apparatus 1, the order switch 5 and magneto-optic disk playback switch 6 or 7 are pressed simultaneously (step S41 or S61 in FIG. 7). If an order is to be placed anew or if the number of prints of an order already placed is to be increased, the order switch 5 and the magneto-optic disk playback switch 6 are pressed simultaneously (step S61).

First, assume that the order switch 5 and magneto-optic disk playback switch 6 have been pressed simultaneously ("YES" at step S41). This establishes the print ordering mode (see FIG. 10). In the print ordering mode, the user can order the printing of an image represented by image data that has been stored in an image file recorded on the magneto-optic disk 32.

If printing of an image is to be ordered, it is necessary that the image to be printed be displayed on the display screen of the monitor 18. If the image is not being displayed on the display screen of the monitor 18 ("NO" at step S42), then the order integrating apparatus 1 is placed in the magneto-optic disk playback mode and the image to be printed is displayed on the display screen of the monitor 18.

If the image to be printed is being displayed on the display screen of the monitor 18 ("YES" at step S42), then it is determined whether an integrated order file has been recorded on the magneto-optic disk 32 (step S43). If an integrated order file has not been recorded ("NO" at step S43), then an integrated order file is created (step S44). If an integrated order file has been recorded ("YES" at step S43), then it is determined whether an order file has been registered in the memory card directory that manages the image being displayed on the display screen of the monitor 18 (step S45). If an order file has not been registered in the memory card directory ("NO" at step S45), then an order file to be registered in this memory card directory is created (step S46).

If an integrated order file has been recorded on the magneto-optic disk 32 and an order file has been registered by a memory card directory identical with the memory card directory that manages the image being displayed ("YES" at steps S43 and S45), then it is determined whether the image being displayed on the display screen of the monitor 18 has already been ordered (step S47). Order files are found from "OrderFile" in the integrated order file and image files in which image data to be printed have been stored are located by "ImageFile" in the order files that have found. If the order has already been placed, then it is decided to increase the number of prints. The number of ordered prints of the image being displayed on the display screen of the monitor 18 is read from the order file (step S49). The read number of prints ordered is incremented and "Quantity" in the corresponding order file is rewritten (step S51).

If the image being displayed on the display screen of the monitor 18 has not been ordered ("NO" at step S47), or if an order file is to be created anew (step S46), the [ORDER] section is created in the order file of the image being displayed (step S48). Since this will be the first order for printing of the image being displayed, "Quantity" in the [ORDER] section is reset to zero (step S50). "Quantity" is then made one (step S51).

In a case where the number of prints is to be increased further, the processing from step 41 to step 51 is repeated. It goes without saying that the order integrating apparatus 1 may be provided with a numeric keypad and that the number of required prints can be entered at one time.

Figure 11:
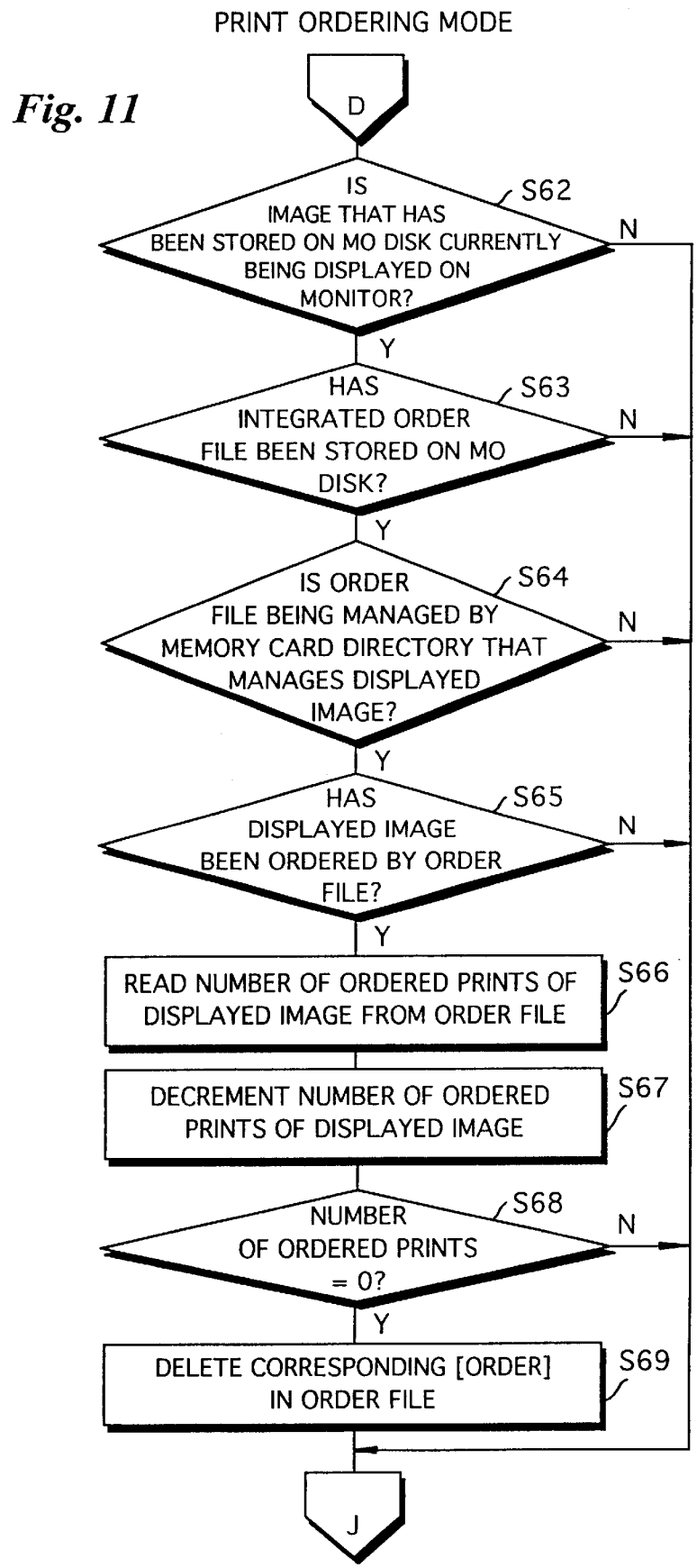

If the order switch 5 and magneto-optic disk playback switch 7 are pressed simultaneously (step S61 in FIG. 7), print order processing for reducing the number of prints is executed (see FIG. 11).

It is also necessary in print ordering processing for reducing the number of prints that the image for which the number of prints is to be reduced be displayed on the display screen of the monitor 18. To accomplish this, it is determined whether the image is being displayed on the display screen of the monitor 18 (step S62). Next, it is determined (step S63) whether an integrated order file has been recorded on the magneto-optic disk 32, it is determined (step S64) whether an order file is being managed by the memory card directory that manages the image being displayed on the monitor 18, and it is determined (step S65) whether the image being displayed has been ordered by an order file. If a "NO" decision is rendered at any of these decision (steps S63 to S65), this means that an image for which the number of prints is to be decreased has itself not been ordered. Subsequent processing, therefore, is skipped.

If the image being displayed on the display screen of the monitor 18 has been recorded in an order file so as to order the printing of the image ("YES" at step S65), then the number of ordered prints of the image being displayed is read from the order file (step S66). The number of ordered prints is decremented (step S67) and it is determined whether the number of ordered prints has reached zero (step S68).

If the number of ordered prints has become zero ("YES" at step S68), then it is construed that there is no longer any order for printing of the image whose number of prints has been reduced. As a result, the [ORDER] section of the corresponding order file is deleted (step S69).

Figure 12:
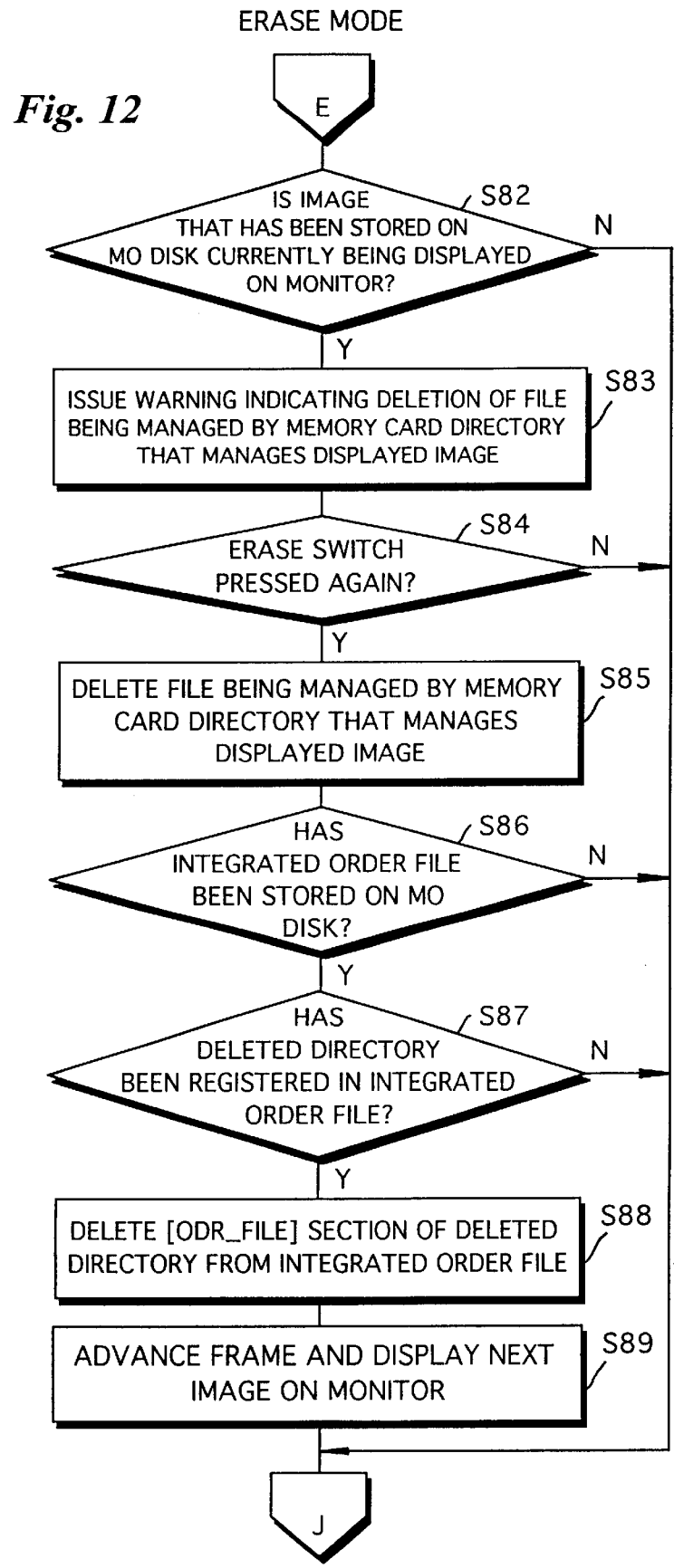

If the erase switch 8 is pressed (step S81 in FIG. 7), then a transition is made to the erase mode (see FIG. 12).

In the erase mode also an image is displayed on the display screen of the monitor 18 in order to confirm the image to be erased. To this end, it is determined whether an image is being displayed on the display screen of the monitor 18 (step S82). If an image is being displayed ("YES" at step S82), the fact that the image file being managed by the memory card directory that manages the displayed image will be deleted is displayed in a form superimposed upon the displayed image (step S83). In a case where the image file is to be erased, the erase switch 8 is pressed by the user again ("YES" at step S84). If erasure is to be canceled, the erase switch 8 is not pressed ("NO" at step S84) and control returns to the processing of step 21 if the timer 21 measures that a fixed period of time has elapsed without the erase switch 8 being pressed again.

If the erase switch 8 is pressed again, all image files that have been registered by the memory card directory that registers the image file regarding the displayed image, as well as the memory card directory, are deleted (step S85). Next, it is determined whether an integrated order file has been recorded on the magneto-optic disk 32 (step S86). In a case where an integrated order file has been recorded, the content of the integrated order file must be altered if an image file is deleted. It is determined whether the deleted memory card directory has been stored in the integrated order file (step S87). If the deleted memory card directory has been stored-in the integrated order file, the [ODR_FILE] section of the corresponding directory is deleted from the integrated order file (step S88).

The images are advanced by one frame to display the image of the next frame on the display screen of the monitor 18 (step S89).

Figure 13:
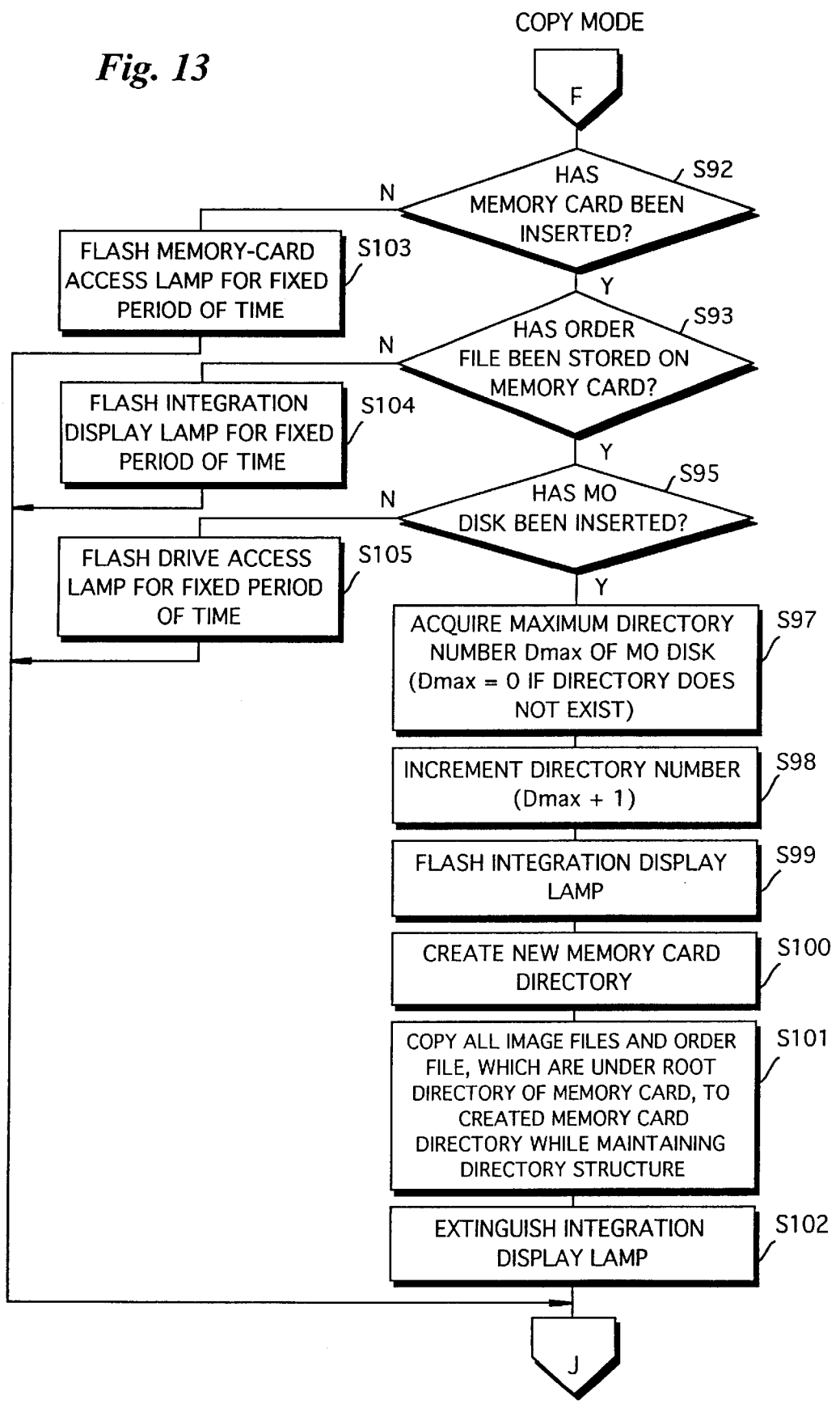

If the copy switch 4 is pressed (step 91 in FIG. 7) the copy mode is established (see FIG. 13).

As mentioned earlier, the copy mode is one in which image files and an order file that have been recorded on the memory card 31 are copied to the magneto-optic disk 32. Accordingly, it is determined whether the memory card 31 has been inserted (step S92). If the memory card 31 has been inserted, it is determined whether an order file has been recorded on the inserted memory card 31 (step S93) and whether the magneto-optic disk 32 has been inserted (step S95).

If the memory card 31 has not been inserted into the memory card slot 10 ("NO" at step S91), the memory-card access lamp 9 is caused to flash for a fixed period of time to notify the user of the fact that the memory card 31 has not been inserted (step S103). If an order file has not been recorded on the memory card 31 ("NO" at step S93), then the integration display lamp 13 is caused to flash for a fixed period of time to notify the user of the fact the order file has not been recorded (step S104). If the magneto-optic disk slot 12 has not been inserted into the magneto-optic disk 32 ("NO" at step S95), then the drive access lamp 11 is caused to flash for a fixed period of time to notify the user of this fact (step S105).

Thus, by observing the lamps 9, 11 and 13, the user may ascertain whether there is any impediment to copying image files and an order file, which have been recorded on the memory card 31, to the magneto-optic disk. If the copy mode is to continue, this means inserting the memory card 31 into the memory-card slot 10 and inserting the magneto-optic disk 32 into the magneto-optic disk slot 12 in dependence upon the flashing of the lamps.

If the magneto-optic disk 32 has been inserted into the magneto-optic disk slot 12 ("YES" at step S95), the maximum value Dmax of the directory numbers of the memory card directories is read from the integrated order file that has been recorded on the magneto-optic disk 32 (step S97). Of course, whether or not an integrated order file has been recorded on the magneto-optic disk 32 is checked in advance. If there is no memory card directory, then the maximum value of the directory number will be zero.

The maximum value of the directory numbers is incremented (step S98) and the integration display lamp 13 is lit to notify the user of the fact that copying is in progress (step S99).

A directory structure to be registered by the memory card directory having the incremented directory number is generated (step S100). The image files and the order file that have been recorded on the memory card 31 are copied to the magneto-optic disk 32, while the directory structure is maintained, so as to be managed by the newly generated memory card directory (step S101). Copy processing then ends and the integration display lamp 13 is extinguished (step S102).

Figure 14:
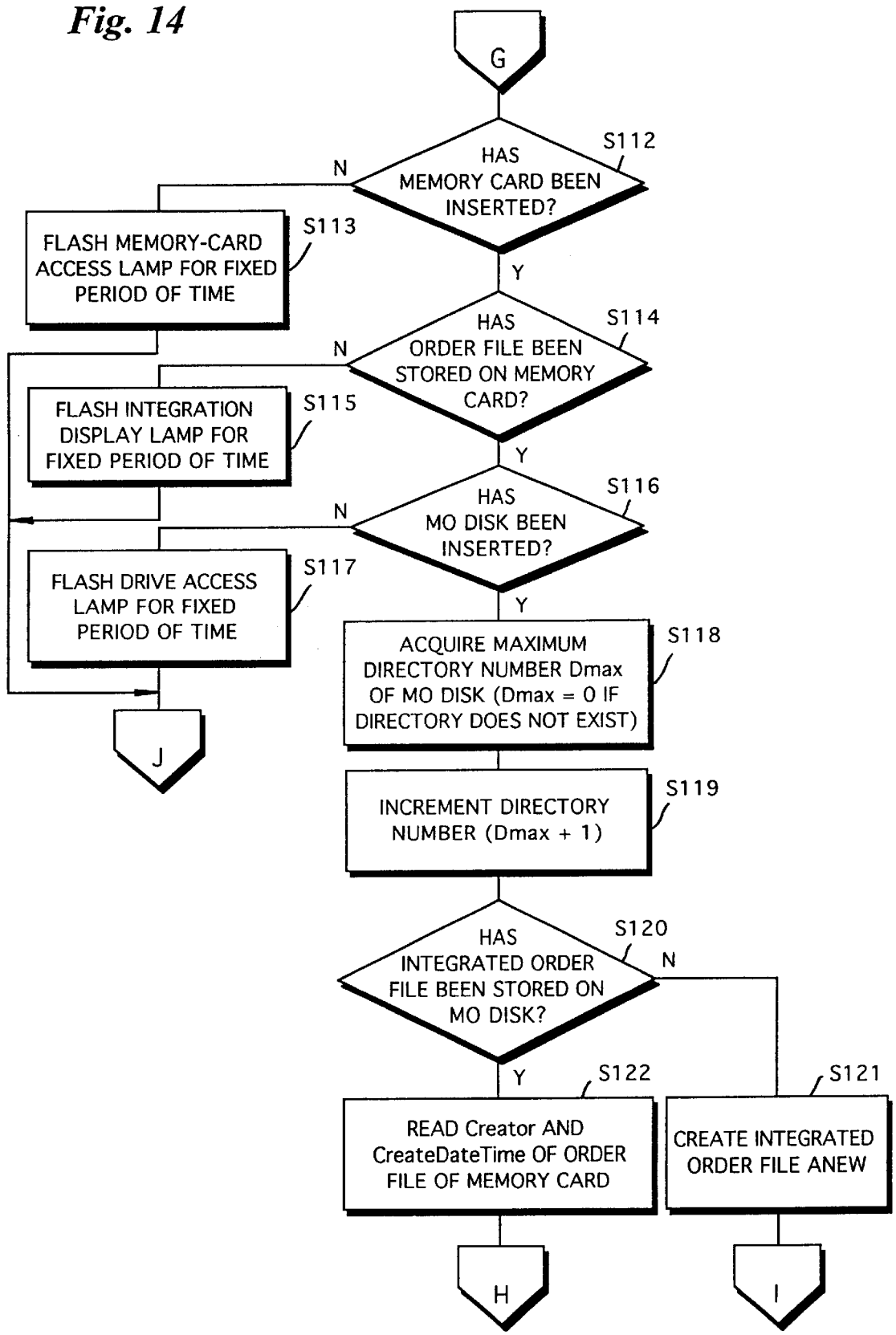
Figure 15:
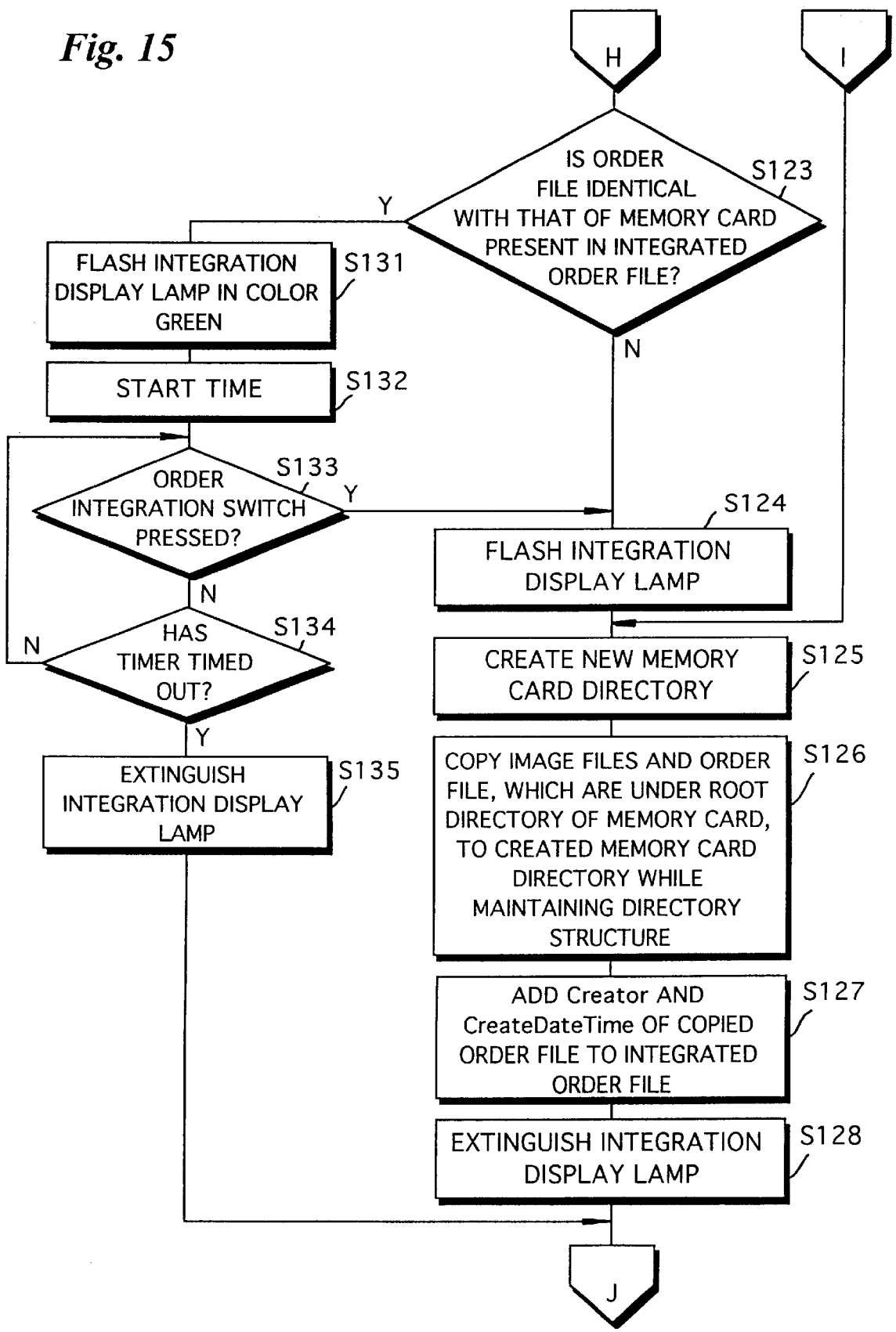

If the order switch 5 and copy switch 4 are pressed simultaneously (step Sill in FIG. 7), a transition is made to the file integrating mode (see FIGS. 14 and 15).

Whereas all images files that have been recorded on the memory card 31 are copied to the magneto-optic disk 32 in the copy mode, image files storing image data representing images to be printed are copied to the magneto-optic disk 32 in the file integrating mode. Further, the integrated order file is created in the file integrating mode. The content of the order file that has been stored on the memory card is recorded in the [ODR_FILE] section of the integrated order file.

In the file integrating mode, it is determined whether the memory card 31 has been inserted (step S112), whether an order file has been recorded on the memory card 31 (step S114) and whether the magneto-optic disk 32 has been inserted (step S116), in a manner similar to that of the copy mode. If the memory card 31 has not been inserted, the memory-card access lamp 9 is caused to flash for a fixed period of time (step S113). If an order file has not been recorded in the memory card 31, the integration display lamp 13 is caused to flash (step S115). If the magneto-optic disk 32 has not been inserted, the drive access lamp 11 is caused to flash (step S117). As in the copy mode, the user is notified by the states of the lamps 9, 11, 13 of any impediment to file integrating processing.

If the magneto-optic disk 32 has been inserted into the magneto-optic disk slot 12 ("YES" at step S116), the maximum value of the directory numbers is read out of the integrated order file of the magneto-optic disk 32 (step S118). The maximum value of the directory numbers is then incremented (step S119).

In order to record the content of the order file that has been recorded on the memory card 31 in the integrated order file, it is determined whether the integrated order file has been recorded on the magneto-optic disk 32 (step S120).

If the integrated order file has already been recorded on the magneto-optic disk 32 ("YES" at step S120), then "Creator" and "CreateDateTime" are read from the order file that has been recorded on the memory card 31 (step S122). Whether or not an order file identical with the order file of the memory card 31 has already been recorded on the magneto-optic disk 32 is checked by checking whether or not "Creator" and "CreateDateTime" that have been read agree with "Creator" and "CreateDateTime" that have been stored in the integrated order file recorded on the magneto-optic disk 32 (step S123). If it is of course permissible to make the above-mentioned determination by checking as to whether the order file itself recorded on the magneto-optic disk 32 agrees with the order file itself recorded on the memory card 31.

If an order file identical with the order file of the memory card 31 has already been recorded on the magneto-optic disk 32 ("YES" at step S123), there is the danger that image files and the order file will be copied from the memory card 31 to the magneto-optic disk 32 redundantly (that the same images will be copied redundantly). The integration display lamp 13 is caused to flash in the color green in order to warn the user of the risk of redundancy (step S131).

The timer 21 starts measuring time from the moment the integration display lamp 13 starts flashing (step S132). If the order switch 5 is not pressed again during time measurement by the timer 21 ("NO" at step S133; step S134), file integrating processing is not executed and the integration display lamp 13 is extinguished (step S135). If the order switch 5 is pressed again during time measurement by the timer 21 ("YES" at step S133), this means that the user has recognized the fact that there is the danger that image files and the order file will be recorded on the magneto-optic disk 32 redundantly. The integration display lamp 13 is caused to flash to inform the user of the fact that file integrating processing will be executed (step S124).

In a case where an integrated order file has not yet been created on the magneto-optic disk 32 ("NO" at step S120), an integrated order file is created anew (step S121). If a new integrated order file has been created, the order file on the memory card 31 will not have been stored in the integrated order file on the magneto-optic disk 32 and, hence, the processing of steps S123 and S124 is skipped.

In the case where file integrating processing is executed, a directory structure is created anew in such a manner that the image files will be registered in the memory card directory having the highest directory number (step S125). Of the image files and order file that have been recorded on the memory card 31, the image files that have been ordered by the order file as well as the order file are copied to the magneto-optic disk 32 while maintaining the directory structure so that these image files and order file will be managed by the memory card directory that has been created (step S126).

As illustrated in FIG. 5, the order file "ORDER.TXT" and image files having the file names "DSC00002.JPG" and "DSC00003.JPG", which have been recorded on the memory card 31, are copied to the magneto-optic disk 32 under the memory card directory "MEDIA001" while the directory structure is maintained unchanged. Image files ("DSC00001.JPG", etc.) in which have been stored image data representing images not ordered by the order file "ORDER.TXT" are not recorded on the magneto-optic disk 32. Only image files necessary for printing are copied to the magneto-optic disk 32.

Unlike simple copy processing, file integrating processing involves generating the integrated order file and adding "Creator" and "CreateDateTime", which were stored in the copied order file, to this integrated order file (step S127). The integration display lamp 13 is extinguished in response to the end of file integrating processing (step S128).

FIGS. 16 and 17, which illustrate other embodiments of the present invention, show the content of integrated order files.

In the integrated order file shown in FIG. 16, only "OrderFile", which indicates the directory number, has been stored in the [ODR_FILE] section. In the integrated order file shown in FIG. 17, a relative path from which the file name of the order file has been deleted has been stored in the [ODR_FILE] section.

There are instances where, depending upon the memory card 31, the order file and the directory managing the order file are predetermined. In such instances it will suffice to record only the directory number, as shown in FIG. 16, or the relative path from which order file name has been deleted, as shown in FIG. 17, in the integrated order file. By referring to the directory number or the relative path from which the file name of the image file has been deleted, it is possible to find the corresponding order file and, as a result, the image files in which image data to be printed has been stored can be found.

Figure 18:
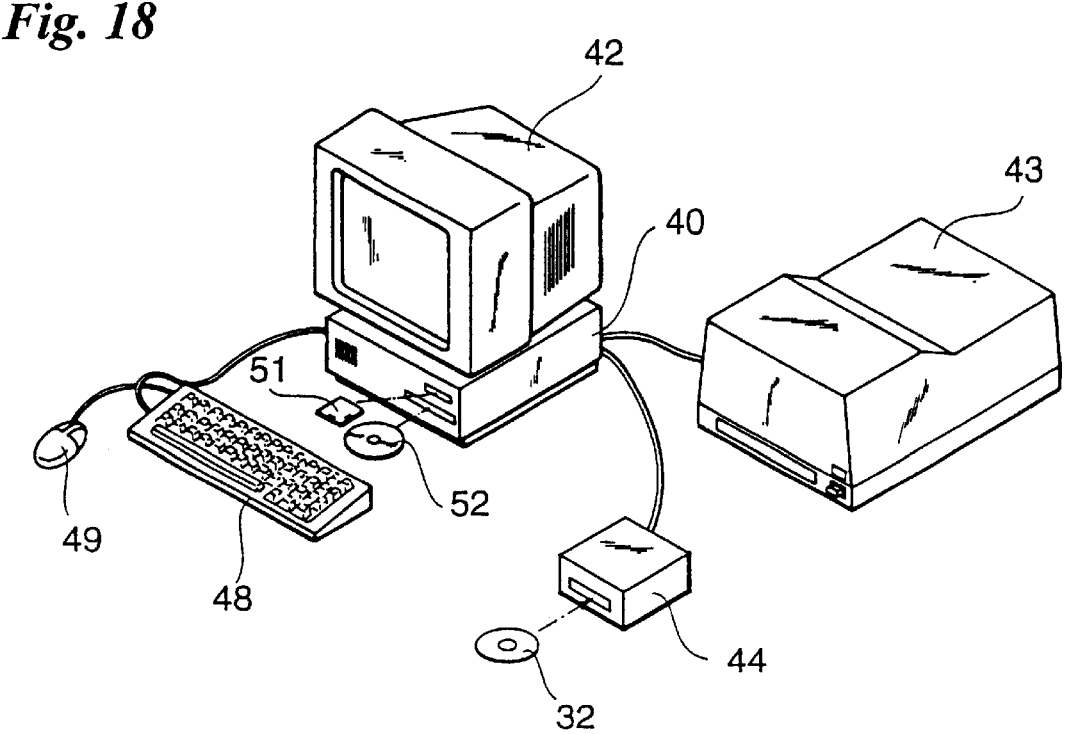
FIG. 18 is a perspective view showing the appearance of a printer system.
Figure 19:
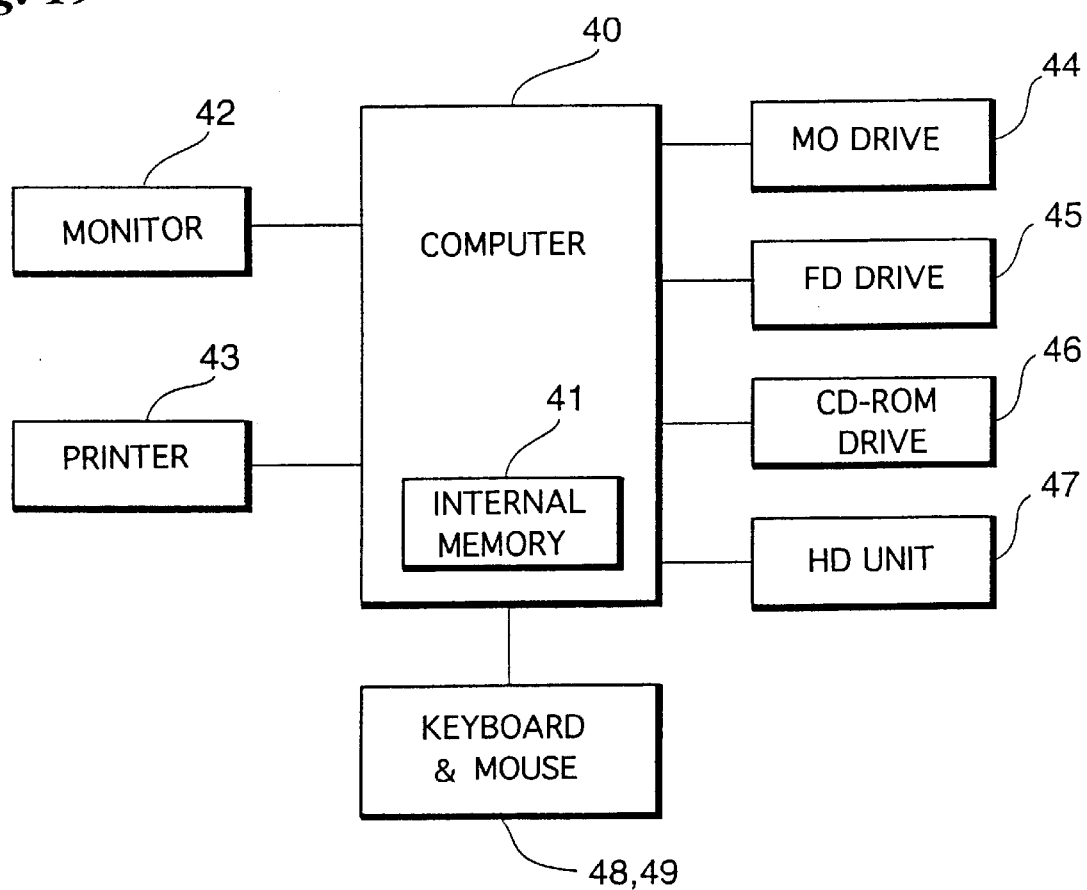
FIG. 19 is a block diagram showing the electrical structure of a printer system.

FIG. 18 illustrates the appearance of a printer system, and FIG. 19 is a block diagram showing the electrical structure of the printer system.

The printer system includes a computer 40 by which print processing is controlled.

Connected to the computer 40 are a magneto-optic disk driver 44 for accessing the magneto-optic disk 32, a floppy disk (FD) drive for accessing a floppy disk 51, and a CD-ROM drive 46 for accessing a CD-ROM 52. Further, a hard disk (HD) drive 47 is connected to the computer 40.

The computer 40 is provided with an internal memory 41 in which data is stored temporarily. A keyboard 48 and a mouse 49 are connected as input devices of the computer 40.

A monitor 42 for displaying images and other information is further connected to the computer 40. Also connected to the computer 40 is a high-quality printer 43 for printing images.

A program for the above-described file integrating processing procedure or a program for a print processing procedure, described later, may be stored on a CD-ROM (e.g., the CD-ROM 52) or other recording medium. The file integrating processing or print processing can be executed by the computer 40 by installing the program, which has been stored on the CD-ROM, in the computer 40.

Figure 20:
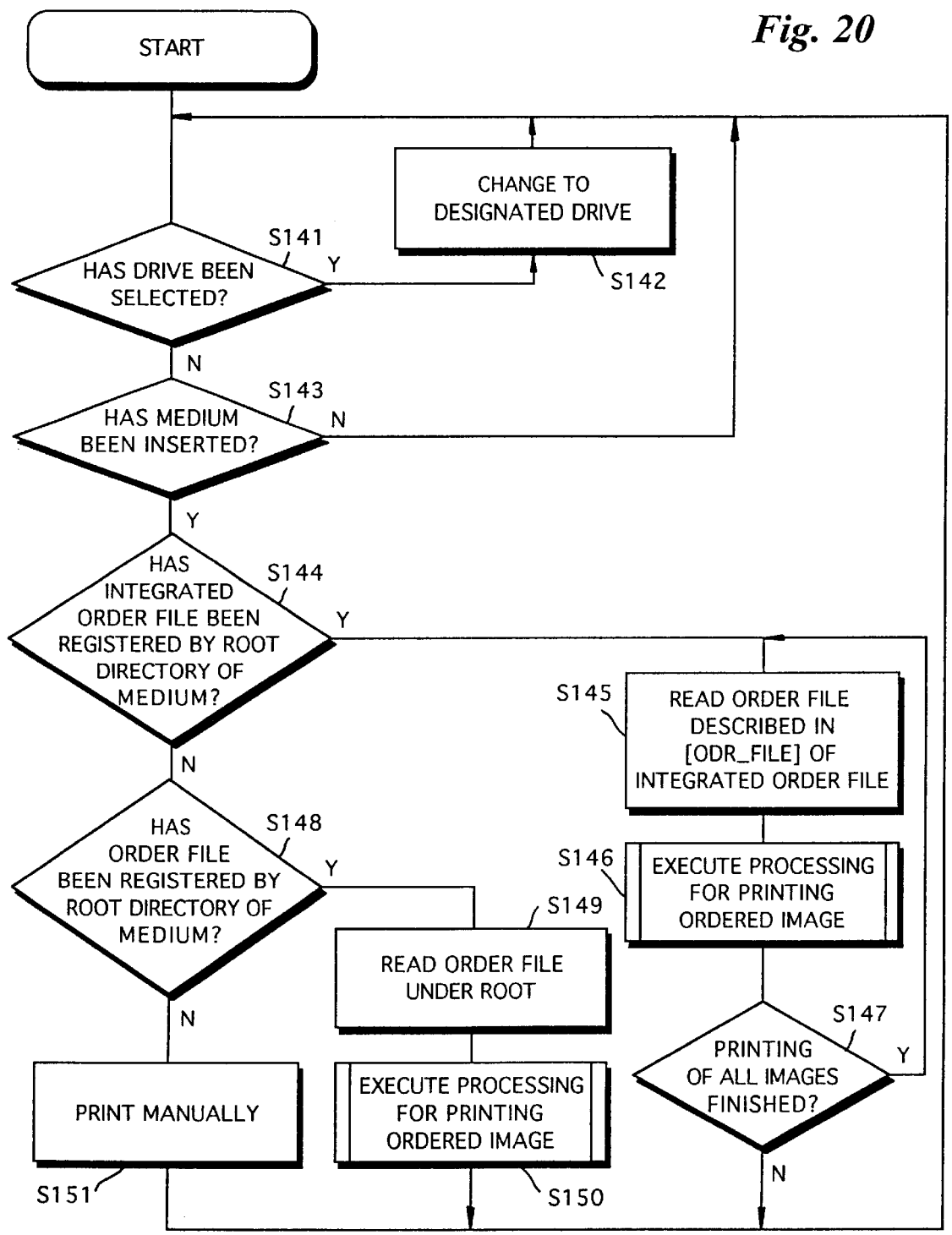
FIG. 20 is a flowchart illustrating the processing procedure of the printer system.

FIG. 20 is a flowchart illustrating a processing procedure for printing images by this printer system.

The operator at a processing laboratory selects the drive of the printer system (step S141). When the selection is made, the active drive changes to the selected drive (step S142).

Next, it is determined whether the floppy disk 51, CD-ROM 52 or magneto-optic disk 32 has been inserted into the selected drive (step S143). If any of these media has been inserted, it is determined whether an integrated order file has been registered in the root directory of the inserted medium (step S144).

If an integrated order file has been registered by the root directory ("YES" at step S144), the content of an order that has been recorded in the [ODR_FILE] section of the integrated order file is read (step S145). An order file is found from the order content that has been read. If an order file is found, image print processing is executed based upon the order content stored in the order file (step S146). Whether all images to be printed have been printed is determined based upon [ODR_FILE] stored in the integrated order file (step S147). The processing of steps 145 and 146 continues until printing is completed.

If an integrated order file has not been registered by the root directory ("NO" at step S144), it is determined whether an order file has been registered in the root directory of the medium (step S148). If an order file has been registered ("YES" at step S148), the registered order file is read (step S149). The printer prints images represented by image data that has been stored in image files designated by the content of the order file that has been read (step S150).

If an order file has not been registered by the root directory of the medium ("NO" at step S148), the operator searches the inserted medium for an image file storing image data representing an image to be printed and this image file is then printed manually (step S151).

Figure 21:
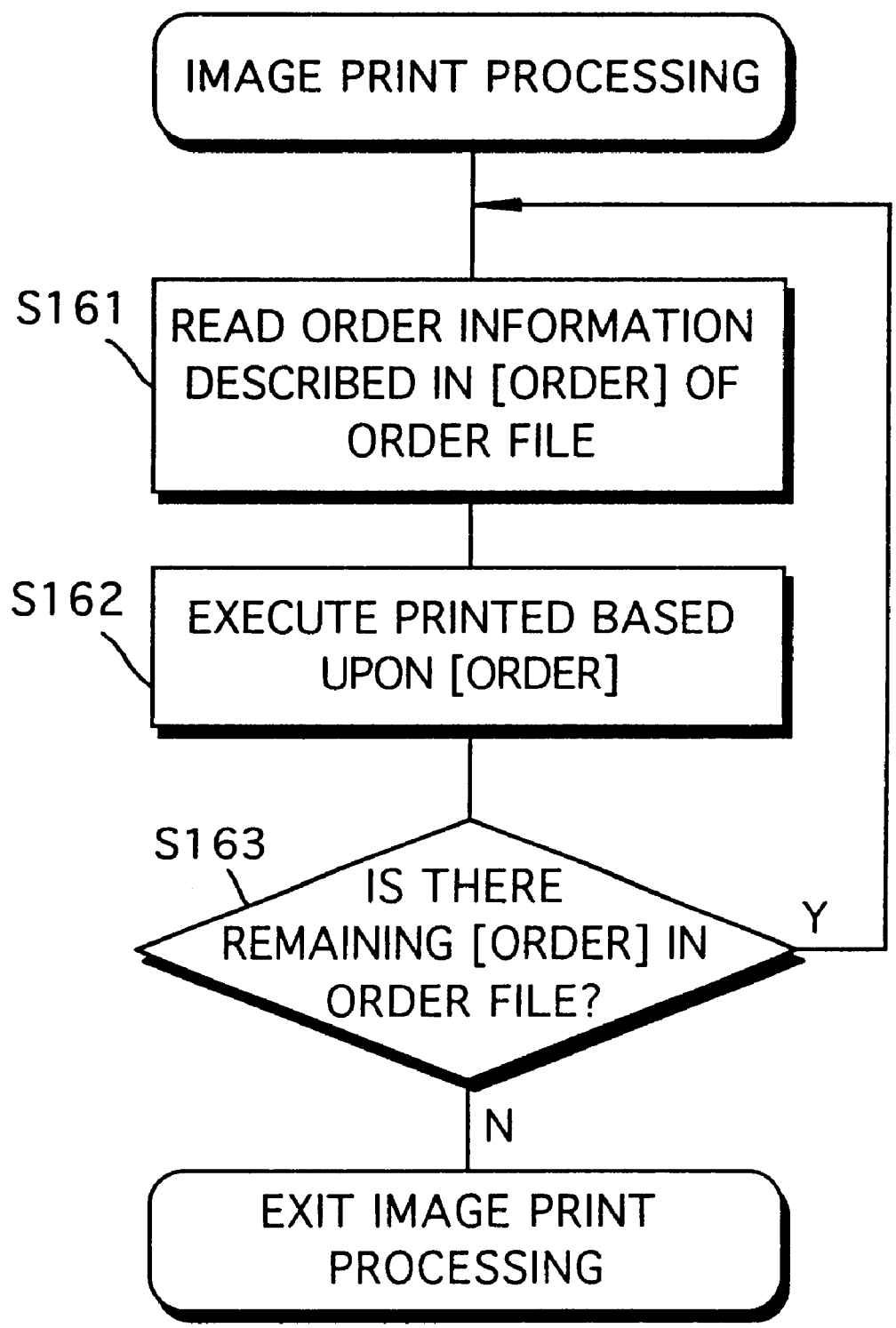
FIG. 21 is a flowchart illustrating the procedure of image printing processing.

FIG. 21 is a flowchart illustrating print processing of an image that has been ordered.

In the printing of an image, the content of the [ORDER] section that has been stored in an order file is read (step S161). The printer 43 is controlled in such a manner that the specified number of prints of an image specified by the read content are printed (step S162). The processing of steps 161 and 162 continues until image print processing based upon all [ORDER] sections is completed (step S163).

As many apparently widely different embodiments of the present invention can be made without departing from the spirit and scope thereof, it is to be understood that the invention is not limited to the specific embodiments thereof except as defined in the appended claims.

What is claimed is:

1. A file integrating apparatus comprising:
    a reading unit for reading image files and an order file from each of a plurality of recording media that are for copying, wherein the image files, in which image data has been stored, and the order file, in which order data for specifying image files in which image data to be printed has been stored, have been recorded on each of the recording media in accordance with a predetermined directory structure;
    a directory generating unit for generating a directory associated with each of the plurality of recording media that are for copying and recording these directories on an integrating recording medium; and
    a copying unit for copying the image files and the order file, which have been read by said reading unit, under a corresponding directory from among the directories generated by said directory generating unit, while maintaining the directory structure of the recording medium that is for copying in which these read files were stored.

2. The apparatus according to claim 1, further comprising:
    a device for generating an integrated order file and storing this file on said integrating recording medium; and
    a storage control unit for storing, in the integrated order file, data relating to order data that has been stored in order files, which have been read by said reading unit, from the plurality of recording media that are for copying.

3. The apparatus according to claim 1, wherein the order data specifies the image files by relative paths.

4. The apparatus according to claim 1, further comprising:
    a determination unit for determining whether an order file identical with said order file copied by said copying unit has already been recorded on the integrating recording medium; and
    a warning unit for issuing a warning in response to a determination by said determination unit to the effect that an identical order file has been recorded on the integrating recording medium.

5. The apparatus according to claim 2, wherein said copying unit copies the order file, image files specified by the order data, and the integrated order file to the integrating medium while maintaining the directory structure.

6. A printer control system comprising:
    a reading unit for reading content of an integrated order file from an integrating recording medium on which have been recorded image files, in which image data has been stored, order files, in which order data for specifying image files in which image data to be printed has been stored, and said integrated order file, in which data relating to order data that has been stored in the order files has been stored;
    an image-file retrieval unit for retrieving, on the basis of the content of the integrated order file read by said reading unit, an image file in which image data representing an image to be printed has been stored; and
    a printer control unit for controlling a printer so as to print an image represented by image data that has been stored in an image file found as the result of retrieval by said image-file retrieval unit.

7. The system according to claim 6, further comprising a determination unit for determining whether the integrated order file has been recorded on the integrating recording medium;
    wherein when said determination unit has determined that the integrated order file has not been recorded on the integrating recording medium, said image-file retrieval unit retrieves an image file, in which image data representing an image to be printed has been stored, based upon the order file.

8. A file integrating method comprising the steps of:

reading image files and an order file from each of a plurality of recording media that are for copying, wherein the image files, in which image data has been stored, and the order file, in which order data for specifying image files in which image data to be printed has been stored, have been recorded on each of the recording media in accordance with a predetermined directory structure;

generating a directory associated with each of the plurality of recording media that are for copying and recording these directories on an integrating recording medium; and copying the read image files and the read order file under a corresponding directory from among the generated directories while maintaining the directory structure of the recording medium that is for copying in which these read files were stored.

9. A computer-readable recording medium on which has been stored a program for integrating, on an integrating recording medium, image files, in which image data has been stored, and order files, in which order data for specifying image files in which image data to be printed has been stored, said program controlling a computer so as to:

read the image files and the order files from each of a plurality of recording media that are for copying, the image files and an order file being recorded on each of these recording media in accordance with a predetermined directory structure;

generate a directory associated with each of the plurality of recording media that are for copying and recording these directories on the integrating recording medium; and copy the read image files and the read order file under a corresponding directory from among the generated directories while maintaining the directory structure of the recording medium that is for copying in which these read files were stored.

10. A printer control method comprising the steps of:

reading content of an integrated order file from an integrating recording medium on which have been recorded image files, in which image data has been stored, order files, in which order data for specifying image files in which image data to be printed has been stored, and said integrated order file, in which data relating to order data that has been stored in the order files has been stored;

retrieving, on the basis of the content of the read integrated order file, an image file in which image data representing an image to be printed has been stored; and controlling a printer so as to print an image represented by image data that has been stored in an image file found as the result of retrieval.

11. A computer-readable recording medium on which has been stored a program for controlling a printer, said program controlling a computer so as to:

read content of an integrated order file from an integrating recording medium on which have been recorded image files, in which image data has been stored, order files, in which order data for specifying image files in which image data to be printed has been stored, and said integrated order file, in which data relating to order data that has been stored in the order files has been stored;

retrieve, on the basis of the content of the read integrated order file read, an image file in which image data representing an image to be printed has been stored; and control the printer so as to print an image represented by image data that has been stored in an image file found as the result of retrieval.

* * * * *